United States Patent
Zhu

(10) Patent No.: US 8,711,916 B2
(45) Date of Patent: Apr. 29, 2014

(54) TAP INITIALIZATION OF EQUALIZER BASED ON ESTIMATED CHANNEL IMPULSE RESPONSE

(75) Inventor: Jie Zhu, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 870 days.

(21) Appl. No.: 11/829,445

(22) Filed: Jul. 27, 2007

(65) Prior Publication Data

US 2009/0028234 A1     Jan. 29, 2009

(51) Int. Cl.
*H03H 7/30* (2006.01)
*H03K 5/159* (2006.01)

(52) U.S. Cl.
USPC ............ 375/229; 375/231; 375/232; 375/233

(58) Field of Classification Search
USPC .................. 375/232, 233, 229, 231
See application file for complete search history.

(56) References Cited

U.S. PATENT DOCUMENTS

| | | | | |
|---|---|---|---|---|
| 5,448,590 | A * | 9/1995 | Kostic | 375/232 |
| 7,457,356 | B2 * | 11/2008 | Lee et al. | 375/233 |
| 2007/0211786 | A1 * | 9/2007 | Shattil | 375/141 |
| 2009/0296786 | A1 * | 12/2009 | Massicotte et al. | 375/148 |

FOREIGN PATENT DOCUMENTS

CN     1612553     5/2005

OTHER PUBLICATIONS

Chinese Patent Office, OA for CN Application No. 200810130049.3, dated Dec. 14, 2010, 8 pgs.
Chinese Patent Office, Chinese Decision of Rejection in corresponding CN Application No. 200810130049.3 dated Jul. 26, 2011 (13 pages).
Korean Patent Office, Korean Notice of Preliminary Rejection in corresponding KR Application No. 10-2008-0073226 dated Mar. 31, 2010 (9 pages).
Taiwan Patent Office (R.O.C.),Taiwanese First Office Action in corresponding TW Application No. 097126638 dated Jun. 29, 2012 (7 pages).

* cited by examiner

*Primary Examiner* — Qutbuddin Ghulamali
(74) *Attorney, Agent, or Firm* — Trop, Pruner & Hu, P.C.

(57) ABSTRACT

A method of initializing tap coefficients of an equalizer may include estimating impulse response coefficients of a channel through which a received signal traveled based on a known portion of the received signal. The method may also include loading the impulse response coefficients into a channel filter and generating a reference signal. The reference signal may be passed through the channel filter to build a training signal. Tap coefficients of the equalizer may be adjusted based on the training signal from the channel filter and on a delayed version of the reference signal.

12 Claims, 3 Drawing Sheets

TAP INITIALIZATION OF EQUALIZER BASED ON ESTIMATED CHANNEL IMPULSE RESPONSE

BACKGROUND

Implementations of the claimed invention generally may relate to the field of equalizers in digital communication systems, and in particular to the initialization such equalizers.

Equalizers are employed in digital communication systems to remove the distortions in a received signal caused by transmission channels. Such equalizers serve an important function in digital communication systems, especially in wireless communication environments where radio multipath always occurs. In ATSC (Advanced Television Systems Committee) digital broadcast television systems, for example, an 8-VSB signal is transmitted through a traditional 6-MHz bandwidth TV channel with symbol rate at 10.76 MHz. Because of multipath propagation, the received signal at a receiver (e.g., TV set) will be a combination of infinite copies of the transmitted 8-VSB passed through different paths with different arrival time and phase. When the difference of these signal copies propagation distances is larger than 30 meters, which is very common, the received signal is distorted by inter-symbol interference. In practice, the difference of the TV signal propagation distance can be up to several kilometers.

Consequently, an equalizer in ATSC TV set typically has several hundred taps and plays the most important role. Many equalizer strategies have been applied to ATSC TV set products in the market. Among them the decision feedback equalizer is a prevalent choice. The decision feedback equalizer typically includes a feed-forward FIR filter and a feed-back FIR filter. The coefficients of these filters are updated according to an error measurement of the equalizer output signal, and are adaptive to changes in the transmission channel(s). The error measurement may be based on either a known output signal (training mode), or some statistics property (blind mode), or an estimate signal (decision mode). Prior to the coefficient adaptation that characterizes normal equalizer operation, the equalizer coefficients are initialized to suitable values.

Typically, the initial values of the equalizer coefficients are determined from an estimated channel whose impulse response is computed by cross-correlating a known training signal with the received signal. Several approaches have been proposed (e.g., those in US2003/0185295, US02004/179483, US2005/0169361, US2005/0254570, etc.) for generation of the equalizer initial coefficients by using an estimated channel. Based on the equalizer structure used, these approaches convert the equalizer computation into an optimization problem and solve the optimization problem by some methods such as MMSE. Due to the computation complexity of the optimization problem, this may involve a large amount of vector and matrix addition and multiplication.

If the initialization computation were performed by software, then a powerful CPU and large memory would be needed. If performed by hardware, specific circuits may be implemented for the initialization computation. Given that equalizer coefficient initialization is done only once for setting up the equalizer coefficients, smaller circuits for equalizer initialization may be desirable.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well known devices, circuits, and methods are omitted so as not to obscure the description of the present invention with unnecessary detail.

The equalizer and process described herein may initialize equalizer coefficients by using the computation capability of the equalizer itself. To achieve this objective, the equalizer may be trained by generating both a reference signal and a corresponding "received" signal which is treated by the remainder of the equalizer as the output of the channel with the reference signal as its input. Once such training has been completed, the equalizer has, in essence, self-initialized to an appropriate set of initial tap coefficients.

Figure 1:
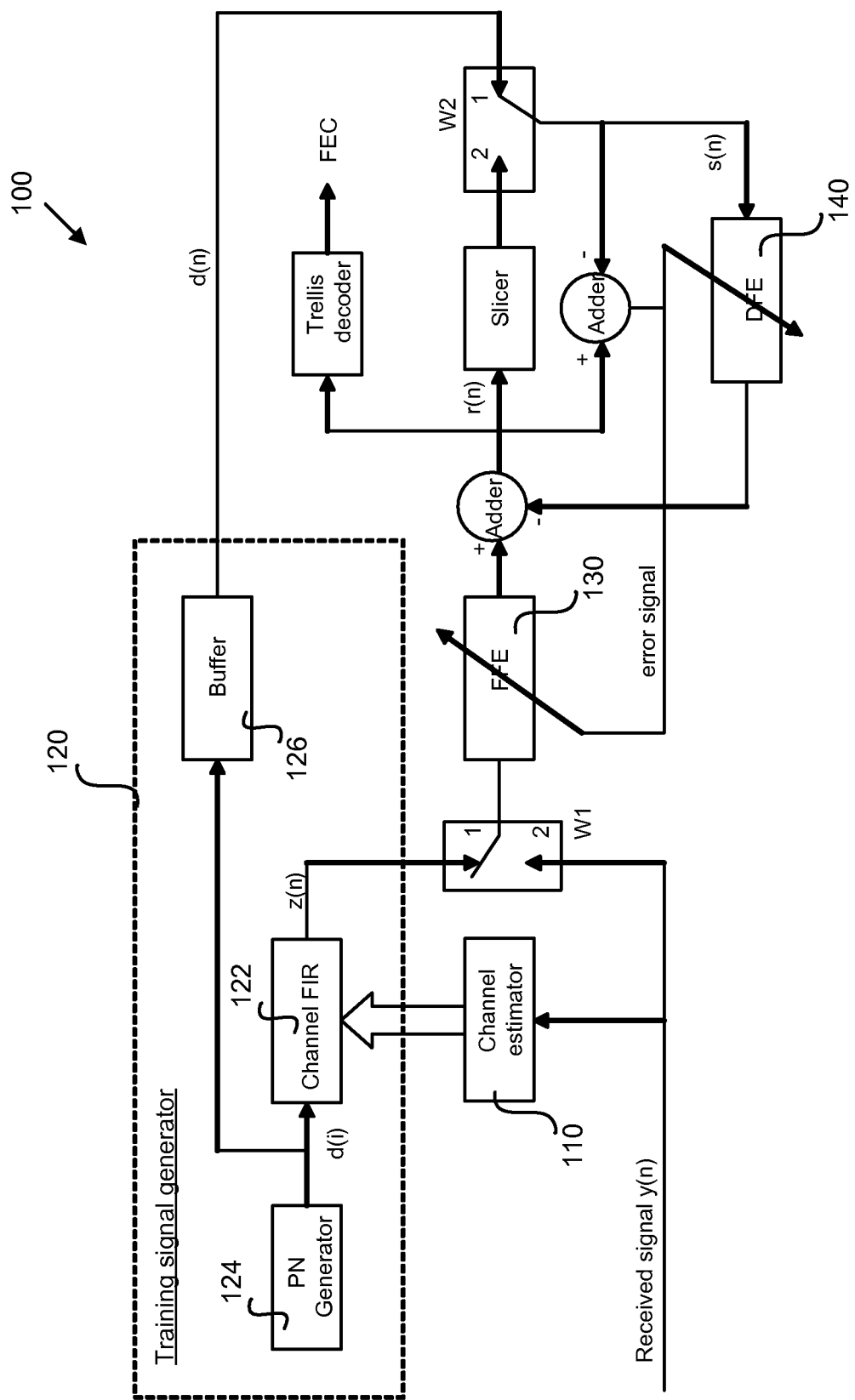
FIG. 1 is a block diagram of an equalizer.

FIG. 1 is a block diagram of an equalizer 100. Equalizer 100 may reside in a larger digital communication system, such as a demodulator, etc. Equalizer 100 may include a channel estimator 110, a training signal generator 120, a feedforward equalizer (FFE) 130, a decision feedback equalizer (DFE) 140, and two switches W1 and W2. Equalizer 100 may also include other components typical of such equalizers, such as adders, a slicer, a Trellis decoder, etc. Although such components are present in FIG. 1, they have known functions which will be understood by those in the equalizer art.

Channel estimator 110 may be arranged to receive a signal y(n) and to generate an impulse response for the channel through which y(n) traveled. The channel impulse response may be computed by estimator 110 by either a cross-correlation method or a segment sync method, for example as disclosed in U.S. patent application Ser. No. 11/763,651, filed Jun. 15, 2007, which is incorporated herein by reference. Channel estimator 110 may use, however, any suitable scheme for estimating the impulse response of the channel through which y(n) was received, including schemes that examine known sync signals (e.g., field syncs and/or segment syncs) in the received signal y(n). Once estimator 110 has estimated the channel impulse response, it may output corresponding coefficients to training signal generator 120.

Training signal generator 120 may include, in some implementations, a channel filter 122, a reference signal generator 124, and a delay buffer 126. Channel filter 122 may be a normal finite-impulse response (FIR) filter in some implementations. Its coefficients may be those of the channel impulse response obtained from channel estimator 110.

In order to carry out the training of equalizer 100, the reference signal d(i) produced by generator 124 should be white, and its spectrum should be flat. Any signal with a flat spectrum may be used as the reference signal d(i). In the implementation shown in FIG. 1, the PN511 sequence generator employed in an ATSC digital television system may be used to generate the reference signal d(i), a pseudo-random number (PN) stream which is defined by $x^9+x^7+x^6+x^4+x^3+x+1$ with preload "010000000." In some implementations, PN generator 124 may output a BPSK (binary phase shift keyed) signal whose symbol value is either 5 or −5.

Channel filter 122 may receive the reference signal d(i) from generator 124, and may output a pseudo-received training signal z(n). Let the channel impulse response estimated by the channel estimator be $c_k$, where $k=-L_1, \ldots, -1, 0, 1, \ldots, L_2$, and where $c_{-L_1} \neq 0$ and $c_{-L_1} \neq 0$. $L_1$ and $L_2$ are two positive integers representing the numbers of pre-echoes and post-echoes present in the channel. The BPSK reference signal generated by a PN generator 124 may be represented as d(i). The training signal z(n) output by channel filter 122 thus may be formulated by $$z(n) = \sum_{k=-L_1}^{L_2} c_k d(n-k).$$

A delayed version d(n) of reference signal d(i) may be generated by buffer 126, due to the presence of FFE 130. If the delay of FFE 130 is designed to be M, for example, then the length of the buffer should be $L_1+M$ in order to anchor the channel coefficient $c_0$ to the main tap of FFE 130.

FFE 130 and DFE 140 are representative of such equalizers in similar configurations, having taps and corresponding tap coefficients. Based on the design specifications of equalizer 100, the coefficient updates for FFE 130 and DFE 140 may be performed either by an LMS (least mean square) algorithm or by an RLS (recursive least square) algorithm. FFE 130 may receive an input of the training signal z(n) from channel filter 122, while DFE 140 may receive an input of the delayed reference signal d(n) from delay buffer 126.

The error signal, which is equal to the equalizer output r(n) minus the delayed reference signal d(n), is used to update the coefficients of FFE 130 and DFE 140. When the update procedure of the equalizer coefficients of FFE 130 and DFE 140 is convergent, or when the energy of the error signal is less than some preset threshold, the convoluted combination of the equalizers 130/140 and channel filter 122 will be an all-pass filter with some delay. Because channel filter 122 is an estimate of the received signal's propagation channel, equalizer 100 after converging thus equalizes the propagation channel. In this manner, training signal z(n) and delayed reference signal d(n) output by training signal generator 120 may initialize the coefficients of equalizer 100 (in particular the equalizer coefficients of FFE 130 and DFE 140).

Because equalizer 100 has a decision-feedback part (e.g., DFE 140), it uses previous symbols to remove the post-echoes. After converging, switches W1 and W2 in equalizer 100 may reliably be switched to position 2 (from position 1 during initialization) for "normal" equalizing of the received signal. Such switching of modes from initialization to normal operation may be performed, for example, during the field sync of received signal y(n), which is known at the receiver side.

Although the implementation of training signal generator 120 in FIG. 1 is a functional design, other implementations are possible. The length of the channel filter 122 typically equals that of the estimated channel, which may be up to several hundred taps. Most of these channel taps, however, may be neglected due to their weak amplitudes. The remainder of the taps may occur in group. Consequently, by considering these characteristics of the ATSC television signal propagation channels, the additional circuits for the initialization in signal generator 120 in FIG. 1 may be altered in some implementations.

It may be assumed with reasonable accuracy that the estimated channel may be partitioned into (N+1) segments, each of which includes up to (L+1) nonzero taps. As a result, the channel FIR filter 122 may be replaced by (N+1) smaller FIR filters. The channel FIR output thus can be represented by $$z(n) = \sum_{n=0}^{N} \sum_{k=0}^{L} c_{k_n+k} d(n-k_n-k)$$

where any significant channel coefficient belongs to one of sets $\{c_{k_n}, c_{k_n+1}, \ldots, c_{k_n+L}\}$ for $n=0, 1, \ldots, N$.

Figure 2:
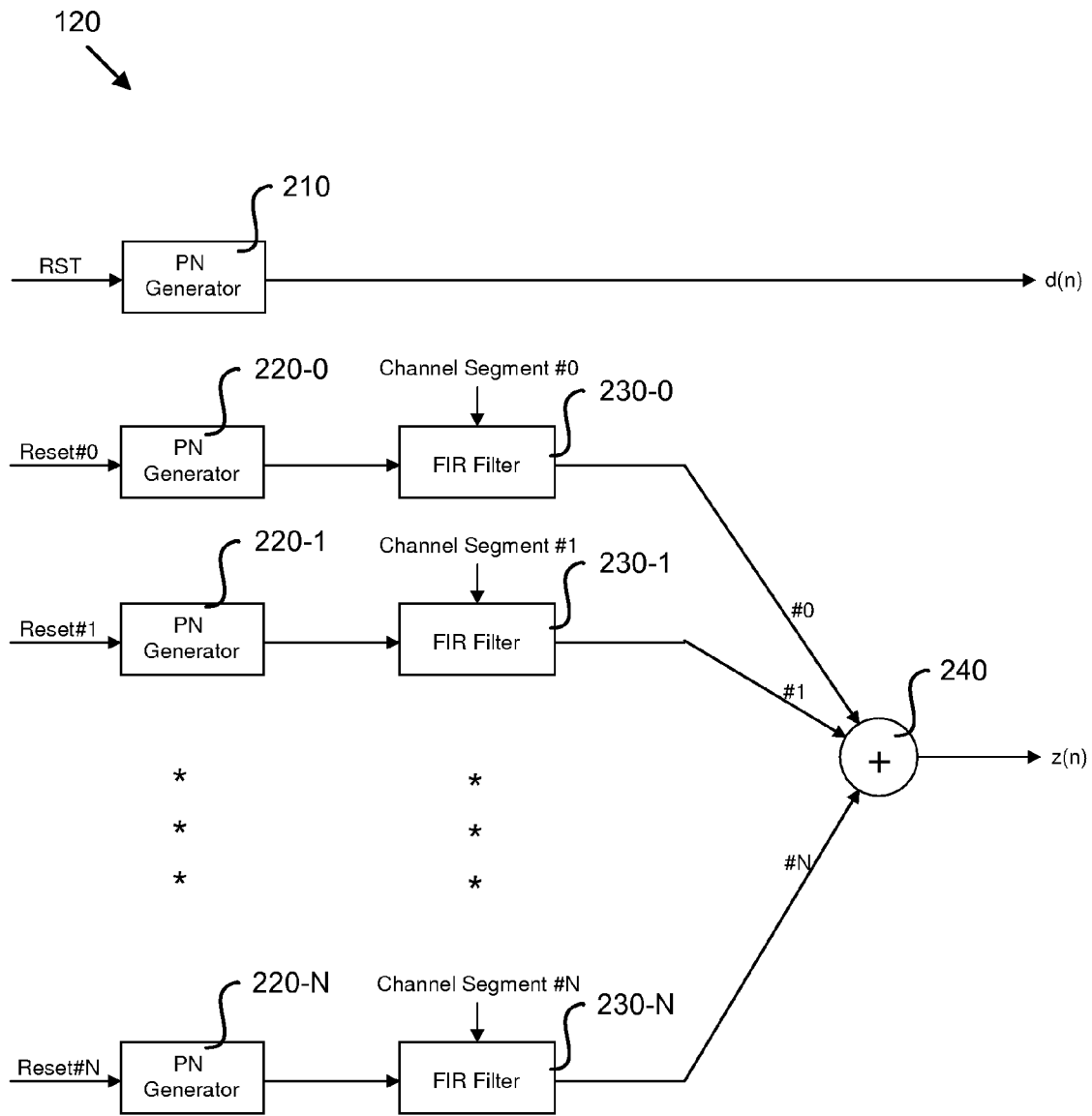
FIG. 2 is a block diagram of another implementation of the training signal generator in the equalizer of FIG. 1.

FIG. 2 is a block diagram of another implementation of training signal generator 120 in equalizer 100 according to such an altered design. Training signal generator 120 may include a PN generator 210, N+1 small FIR filters 230-0, ..., 230-N (collectively, "filters 230"), N+1 PN generators 220-0, ..., 220-N (collectively, "generators 220"), and a combiner 240. Referring to the FIG. 2, the total number of the channel filter's taps shrinks to (N+1)*(L+1). One set of example values for N and L is that N=7 and L=9.

Every small FIR filter 230 has an associated a PN sequence generator 220. These generators 220 have the same logic and are carefully reset based on the locations of the channel taps used in the related small FIR filter. More precisely, to "reset a PN generator" may be defined as "pre-load an initial value to the registers in PN generator" at a given time.

As an example, if the PN generators 21 and 220 employ the PN511 logic in ATSC, the pre-load value is "010000000." The occurrence of the reset signal of the PN generator related to the channel coefficient $[c_{-L_1}, \ldots, c_{-L_1+L-1}]$ may be denoted as the time origin. Under such convention, if channel impulse response coefficients $[c_i, \ldots, c_{i+L-1}]$ are applied to small FIR filter #n (e.g., filter 230-n, where n is between 1 and N), then the reset signal #n of PN generator #n (e.g., generator 220-n) should be $(L_1+i)$ symbol clocks later than the time origin. The reset signal of PN generator for the reference signal d(n) should be $(L_1+M)$ symbol clocks later than the time origin.

In this manner, timing generator 120 in FIG. 2 may produce the training signal z(n) and delayed reference signal d(n) for use in initializing the tap values of FFE 130 and DFE 140.

Figure 3:
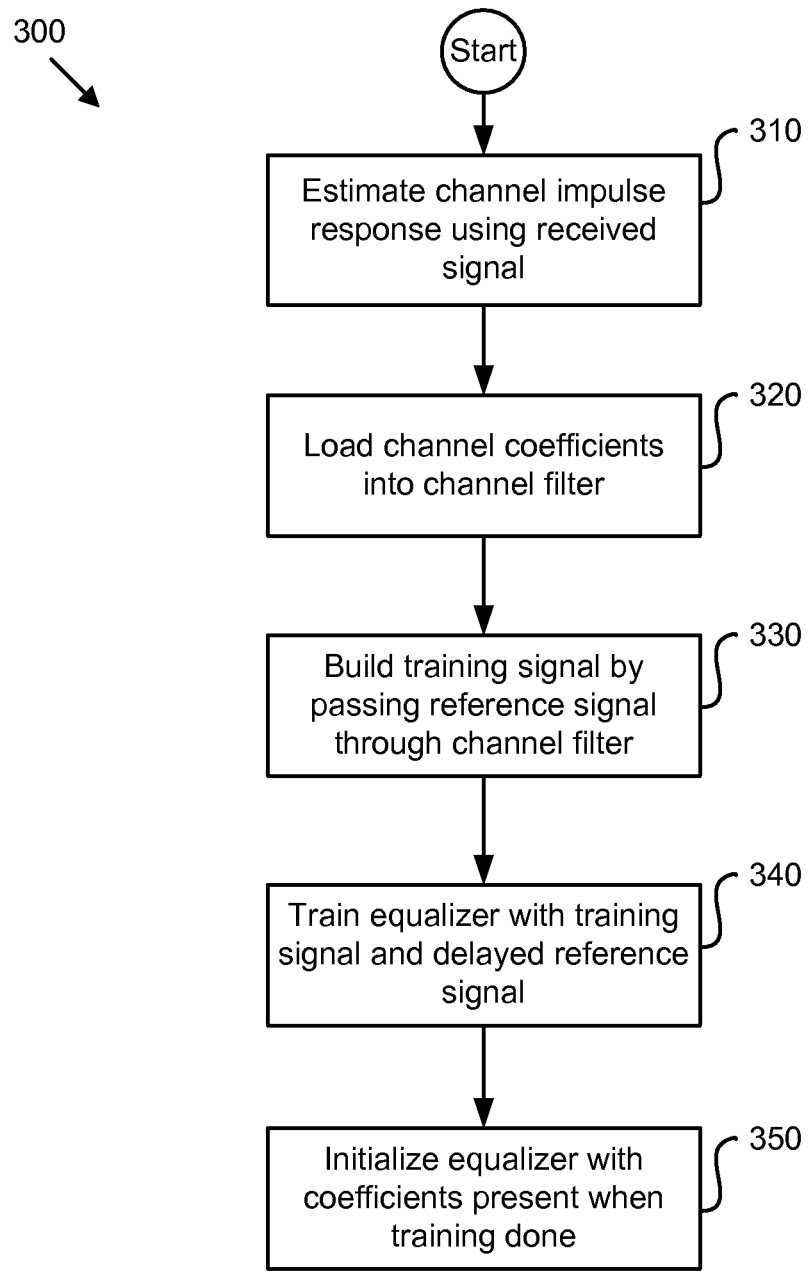
FIG. 3 is a flowchart illustrating a process of initializing tap values of an equalizer.

FIG. 3 is a flowchart illustrating a process 300 of initializing tap values of an equalizer. Although process 300 may be explained with reference to equalizer 100, it may be performed by a different apparatus provided the actions described below are performed. Process 300 may begin with channel estimator 110 estimating the impulse response of a channel using a received signal y(n) that has traveled through that channel [act 310]. Examples of known signals from which the impulse response may be estimated may include field sync signals and/or segment sync signals within a received ATSC broadcast y(n). The impulse response of the channel may be estimated by estimator 110 using cross-correlation techniques, or any other suitable technique for characterizing the impulse response from a received signal where the transmitted signal is known.

Processing may continue with estimator 110 loading coefficients of the impulse response into a channel filter 122 (or corresponding filters 230 in FIG. 2) [act 320]. The channel filter 120/230 may be, for example, a multi-tap FIR filter that, once loaded with the (estimated) impulse response coefficients, mimics the behavior of the channel through which the received signal y(n) traveled.

Training signal generator 120 may build a training signal z(n) by generating and passing a reference signal d(i) through channel filter 122/230 [act 330]. The training signal z(n) acts as a locally-generated "received" signal corresponding to the reference signal d(i) after it has been transmitted through the channel whose impulse response was estimated in act 310.

Next the training signal z(n) and a delayed version d(n) of reference signal d(i) may be input to appropriate portions of equalizer 100 to train coefficients in these portions to equalize channel filter 122 [act 340]. In some implementations, training signal z(n) may be input to a feedforward portion, FFE 130, and delayed reference signal d(n) may be input to a feedback portion, DFE 140. FFE 130 and DFE 140 may adjust their tap coefficients based on an error signal generated from their joint output r(n) minus delayed reference signal d(n). The training signal z(n) and delayed reference signal d(n) may be applied until equalizers 130 and 140 converge, and/or until the energy of the error signal falls below a predetermined threshold, perhaps during a sync period in the received signal y(n).

When the training in act 340 is considered complete by a suitable criteria, training may cease via the switching of switches W1 and W2 to remove training signal generator 120 from equalizer 120. The coefficients present in FFE 130 and DFE 140 when this occurs are the initialization values for equalizer 100 [act 350]. Via process 300, the equalizer 100 has self-generated, or learned, its initialization coefficients using an internally-generated training signal z(n) produced by an internal, channel-simulating filter 122/230.

The above-described scheme and/or system may advantageously compute the initial coefficient values of an equalizer 100 by using the equalizer's own adaptation ability. It first estimates the channel impulse response using a known signal embedded in the received signal y(n). Then generator 110 builds a training signal z(n) to train the equalizer 100 by passing a generated reference signal d(i) through an estimated channel (e.g., filter 122).

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

For example, implementation details of equalizer 100 may be modified without departing from the channel estimating and self-initializing nature of the equalizer.

No element, act, or instruction used in the description of the present application should be construed as critical or essential to the invention unless explicitly described as such. Also, as used herein, the article "a" is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. An equalizer, comprising:
   a channel estimator to estimate an impulse response of a transmission channel based on a received signal;
   a channel filter coupled to said estimator to load coefficients;
   a training signal generator coupled to said channel filter to send a reference signal through the channel filter to build a training signal, said generator to generate a delayed reference signal and train the equalizer with the training signal and the delayed reference signal; and
   said training signal generator to generate a reference signal, the generator including a plurality of reference signal generators each coupled to a separate channel filter and an adjustable equalizer portion to initialize equalizer coefficients based on the reference signal and on the training signal from the training signal generator.

2. The equalizer of claim 1, wherein the channel estimator is arranged to estimate the impulse response based on a field sync signal or a segment sync signal in the received signal.

3. The equalizer of claim 1, wherein the training signal generator includes:
   a pseudo-random signal generator to generate the reference signal.

4. The equalizer of claim 1, wherein the transmission channel includes a finite impulse response filter with tap coefficients corresponding to the impulse response from the channel estimator.

5. The equalizer of claim 1, wherein the adjustable equalizer portion includes:
   a feedforward equalizer to receive the training signal and to output a first output signal,
   a decision feedback equalizer to receive a delayed version of the reference signal and to output a second output signal.

6. The equalizer of claim 5, wherein the adjustable equalizer portion further includes:
   at least one combiner to combine the first output signal, the second output signal, and the delayed version of the reference signal to produce an error signal,
   wherein coefficients of the feedforward equalizer and coefficients of the decision feedback equalizer are adjusted based on the error signal.

7. The equalizer of claim 1, further comprising:
   at least one switch to disconnect the training signal generator from the adjustable equalizer portion when the equalizer coefficients of the adjustable equalizer portion have been initialized.

8. A method comprising:
   estimating channel impulse response using a received signal;
   loading channel coefficients into a channel filter;
   building a training signal by passing a reference signal through the channel filter; and
   training an equalizer with the training signal and a delayed reference signal, using a training signal generator including a plurality of reference signal generators each coupled to a separate channel filter and an adjustable equalizer portion to initialize equalizer coefficients based on the reference signal and on the training signal from the training signal generator.

9. The method of claim 8, wherein the estimating includes:
   estimating the impulse response coefficients of the channel based on a field sync signal or a segment sync signal in the received signal.

10. The method of claim 8 including, generating a pseudo-random reference signal that is statistically white.

11. The method of claim 8, wherein the adjusting includes:
    adjusting the tap coefficients of the equalizer based on an error signal that is a different between an output of the equalizer and the delayed version of the reference signal.

12. The method of claim 8, further comprising:
   initializing the tap coefficients of the equalizer by disconnecting the channel filter from the equalizer when the tap coefficients have converged.

* * * * *